United States Patent [19]

Keller et al.

[11] Patent Number: 5,462,810
[45] Date of Patent: Oct. 31, 1995

[54] MAGNETIC RECORDING MEDIUM

[75] Inventors: Harald Keller, Ludwigshafen; Ulrich Jaeger, Harthausen; Helmut Steininger, Worms; Helmut Kopke, Weisenheim; Klaus D. Schomann, Ludwigshafen; Hans-Peter Schildberg, Mannheim, all of Germany

[73] Assignee: BASF Magnetics GmbH, Mannheim, Germany

[21] Appl. No.: 180,074

[22] Filed: Jan. 11, 1994

[30] Foreign Application Priority Data

Jan. 15, 1993 [DE] Germany .................. 43 00 858.5

[51] Int. Cl.$^6$ .................. G11B 5/66; G11B 5/72
[52] U.S. Cl. .................. 428/694 T; 428/421; 428/422; 428/694 TP; 428/694 TF; 428/694 TM; 428/695; 428/900; 428/704; 568/18; 568/21; 568/22; 568/29; 568/31; 568/303; 570/101; 570/123; 570/136
[58] Field of Search .................. 428/421, 422, 428/694 T, 694 TP, 694 TF, 694 TM, 695, 900, 704; 568/18, 21, 22, 29, 31, 303; 570/101, 123, 136

[56] References Cited

U.S. PATENT DOCUMENTS

| | | | |
|---|---|---|---|
| 3,353,166 | 11/1967 | Brock | 360/135 |
| 3,767,369 | 10/1973 | Barlow et al. | 428/648 |
| 3,778,308 | 6/1976 | Roller et al. | 428/421 |
| 4,029,541 | 6/1977 | Barlow et al. | 427/130 |
| 4,268,369 | 5/1981 | Barlow et al. | 204/192.16 |
| 4,277,540 | 7/1981 | Aine | 428/627 |
| 4,696,845 | 9/1987 | Yanagisawa | 428/64 |
| 4,770,924 | 9/1988 | Takai | 428/212 |
| 4,778,915 | 10/1988 | Lina | 560/29 |
| 4,803,125 | 2/1989 | Takeuchi | 428/411.1 |
| 4,816,334 | 3/1989 | Yokoyama et al. | 428/336 |
| 4,835,032 | 5/1989 | Arioka | 428/143 |
| 4,837,116 | 6/1989 | Arioka | 428/141 |
| 4,892,789 | 1/1990 | Nakayama et al. | 428/336 |
| 5,041,336 | 8/1991 | Ohya | 428/423.1 |
| 5,061,562 | 10/1991 | Yamanaka et al. | 428/408 |
| 5,069,973 | 12/1991 | Saito | 428/421 |
| 5,089,330 | 2/1992 | Sato | 428/323 |
| 5,128,216 | 7/1992 | Ng | 428/695 |
| 5,137,784 | 8/1992 | Suzuki | 428/408 |

FOREIGN PATENT DOCUMENTS

| | | |
|---|---|---|
| 282188 | 9/1988 | European Pat. Off. . |
| 320241 | 6/1989 | European Pat. Off. . |
| 109101 | 12/1974 | Germany . |
| 3816467 | 12/1988 | Germany . |

*Primary Examiner*—L. Kiliman
*Attorney, Agent, or Firm*—Keil & Weinkauf

[57] ABSTRACT

A magnetic recording medium comprises a nonmagnetic substrate and at least one ferromagnetic metal layer applied thereon and a protective layer formed on this metal layer and consisting of a compound which consists of an unfluorinated or partially fluorinated alkyl radical and a disulfide, hydroxyl or keto group.

7 Claims, No Drawings

MAGNETIC RECORDING MEDIUM

The present invention relates to a magnetic recording medium comprising a nonmagnetic substrate and at least one ferromagnetic metal layer applied thereon and a protective layer formed on this metal layer consisting of an organic material.

The magnetic layers of the conventional recording media consist of polymeric organic binders with magnetic oxide or metal particles finely distributed therein. In the course of efforts to increase the recording density of the magnetic recording media, particularly in the area of video and data recording, it was necessary constantly to reduce the layer thicknesses of the recording layer. However, such thin layers can no longer be obtained with the oxide or metal particle/binder layers. It has therefore been proposed to use thin ferromagnetic metal layers as recording layers. Chemically or electrolytically deposited ferromagnetic metal or alloy layers, in particular comprising cobalt and/or nickel, and especially ferromagnetic layers of the metals or alloys of, for example, iron, cobalt, nickel, chromium and rare earths, applied to the substrate by vapor deposition or sputtering, are known.

However, such recording media are generally in continuous mechanical contact with the head during use. This means that the surface of the magnetic layer must have excellent corrosion resistance and abrasion resistance. Since, however, the ferromagnetic metal layers suitable for the recording layers generally do not have corresponding properties, it is necessary to produce protective layers. When choosing such protective layers, care should be taken to ensure that the magnetic layer is not adversely affected in any way either by the application of the protective layer or by the protective layer itself.

A large number of proposals have already been made for solving these problems. Thus, U.S. Pat. No. 3,767,369 describes the application of a rhodium protective layer for improving the hardness and the frictional properties, it being necessary to apply an intermediate tin/nickel layer in order to improve the insufficient adhesion of the rhodium to the magnetic layer. This process does not provide the currently required properties of the protective layer, nor is the application thereof simple and without problems. For all those cases where the metallic magnetic layer is cobalt-containing, it has been proposed to heat this magnetic layer at predetermined humidity in air and hence to oxidize its surface (U.S. Pat. Nos. 3,353,166, 4,029,541). However, such a process has particular disadvantages. Thus, a heating process which is required for the production of the stated protective layers can influence both the magnetic properties of the recording layer itself and conventional lower or intermediate layers in such a way that they in turn adversely affect the properties of the magnetic layers.

In other processes, various protective layers are applied under reduced pressure, generally by sputtering, for example, according to U.S. Pat. No. 4,277,540, layers of gold, tantalum, niobium, platinum, chromium, tungsten and rhodium as well as the nitrides or carbides of silicon, zirconium, hafnium and of titanium and, according to U.S. Pat. No. 4,268,369, layers of silica. Furthermore, DD-A 109 101 describes protective layers comprising carbon layers grown under reduced pressure for magnetic stores having a thin metal layer. However, owing to insufficient corrosion protection, such protective carbon layers are not very suitable for the purely metallic magnetic layers. The production of a top layer comprising a plasma-polymerized film containing carbon and hydrogen is also known (DE-A 35 45 794).

The application of liquid oligomers, for example of perfluoropolyethers, to the magnetic layer to be protected has also been disclosed, for example in U.S. Pat. No. 3,778,308. In addition to the use of a very wide range of generally fluorine-containing substances, as described in, for example, EP-A 282 188 or EP-A 320 241, for the formation of protective layers, it has also been proposed to use for this purpose combinations of solid and liquid lubricants, for example semifluoro compounds and perfluoropolyethers (DE-A 38 16 467) or carbon layers in conjunction with fluorinated products (JP A 79 916/1989) and carbon layers formed by plasma decomposition together with organofluorine compounds (U.S. Pat. No. 4,816,334). A substantial problem with the use of the perfluorinated polyethers is their poor solubility in organic nonfluorinated solvents.

Although all these protective layers result in an improvement with regard to the particular problem to be tackled, they are not satisfactory in all properties, especially in abrasion resistance, frictional properties and durability and with regard to corrosion, while at the same time having no adverse effect on the recording properties of the magnetic layer.

SUMMARY OF THE INVENTION

It is an object of the present invention to provide a magnetic recording medium in which the protective layer produced on the ferromagnetic thin metal layer does not have the abovementioned disadvantages and exhibits in particular good abrasion resistance and corrosion resistance.

We have found that this object is achieved by a magnetic recording medium comprising a nonmagnetic substrate and at least one ferromagnetic metal layer applied thereon and a protective layer formed on the metal layer, if the protective layer consists of a compound of the general formula I $$Z-(CF_2)_m-(CH_2)_n-X-Y-(CH_2)_n-(CF_2)_m-Z \qquad (I)$$

where

X is an —S— or —CHOH radical,

Y is an —S— or

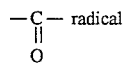

Z is a —CH$_3$, —CF$_3$ or —CH=CH$_2$ radical n is an integer of from 2 to 17 and m is an integer of from 0 to 7.

Substances for the protective layer which are particularly suitable for the purposes of the present invention are in particular the following compounds 1 to 5:

$$[-S-(CH_2)_{11}-CH_3]_2 \qquad (1)$$

$$[-S-(CH_2)_{17}-CH_3]_2 \qquad (2)$$

$$[-S-(CH_2)_2-(CF_2)_7-CF_3]_2 \qquad (3)$$

$$[-S-(CH_2)_2-(CF_2)_5-CF_3]_2 \qquad (4)$$

$$H_2C=CH-(CH_2)_8-CHOH-CO-(CH_2)_8-CH=CH_2 \qquad (5)$$

These compounds are prepared by the known methods of organic chemistry. Thus, the compounds (1) and (2) are obtained from the corresponding thiols by oxidation with iodine, while the compounds (3) and (4) are obtained starting from the fluorinated alcohols via the methanesulfonic esters, converting into the particular mixed salts with sodium thiosulfate and subsequently oxidizing with iodine to give the disulfides. The compound (5) is synthesized by subjecting methyl 10-undecenoate to an acyloin synthesis with sodium and chlorotrimethylsilane and subsequently hydrolyzing the product.

The magnetic recording media having a ferromagnetic thin metal layer and their structure comprising a nonmagnetic substrate, if necessary a nonmagnetic intermediate layer and a ferromagnetic metal layer are known. Conventional substrates are both rigid and flexible materials. Discs of aluminum or of alloys thereof and discs or film webs of polyethylene terephthalate or polyimide are predominantly used.

For the formation of suitable magnetic layers, the substrates are provided with a nonmagnetic lower layer. Chemically or autocatalytically deposited amorphous nickel/phosphorus alloy layers having a phosphorus content of from 7 to 11% by weight are known in the case of disc-like aluminum substrates. The layer thicknesses are usually from 5 to 50 µm, in particular from 10 to 30 µm. The nonmagnetic lower layers thus applied result in an improvement in the processability of the surface in the case of the aluminum substrates compared with the uncoated aluminum substrate.

Suitable ferromagnetic thin metal layers are the conventional ones having layer thicknesses of from about 300 to 1500 Å, which are deposited in a manner known per se by chemical deposition, electrochemical deposition or vapor deposition or sputtering, ie. deposition of the metals or metal alloys at greatly reduced pressure on the substrates. Examples of suitable magnetic materials are iron, nickel, cobalt or alloys thereof with one another or with small amounts of other elements. Suitable cobalt-containing ferromagnetic thin metal layers include cobalt/phosphorus alloys, cobalt/boron alloys, cobalt/nickel alloys, cobalt/nickel/iron alloys, cobalt/iron alloys and alloys of the stated type containing phosphorus, boron and/or nitrogen, for example alloys of from 95 to 98% of cobalt and from 2 to 10% of phosphorus, from 30 to 20% of nickel and from 70 to 80% of cobalt, 90% of cobalt, 9% of nickel and 1% of phosphorus, 88% of cobalt, 9% of nickel and 3% of boron or from 40 to 50% of cobalt, from 40 to 50% of nickel and from 1 to 5% of boron. Films having a thickness of less than 60 nm and, for example, a coercive force of from 20 to 75 kA/m and a saturation magnetization of from 1 to 1.5 Tesla can be produced with these alloys by chemical deposition on polished substrates. Ferromagnetic layers which are produced by a sputter process and may be deposited on an intermediate chromium layer applied by sputtering are also suitable. Alloying of chromium with a magnetic layer is also known.

The formation of the protective layer for the production of the novel recording media is carried out in a conventional manner. A solution of the compounds of the formula (I) is transferred to the surface of the thin metal layer media via the roller, and the solvent, which may be, for example, tetrahydrofuran, is then removed in a drying tunnel. By varying the roller parameters and the concentration of the substance of the formula (I) in the solvent, it is possible to adjust the thickness of the protective layer on the novel recording media. A concentration of from 0.01 to 0.04% by weight has proven particularly advantageous. At higher concentration, the formation of the protective layer is nonuniform and furthermore problems are encountered owing to the deposition of the applied substance on the heads of the recording and playback apparatuses. The compound forming the protective layer can also be applied by drawing the recording medium through the solution of the particular substance.

The novel magnetic recording media have excellent mechanical strength of the surface, which manifests itself in particular resistance during repeated use of the recording medium. Furthermore, as a result of the protective layer, the novel magnetic recording media are very stable to the corrosion of the thin magnetic metal layers caused by air or atmospheric humidity.

The example which follows illustrates the invention.

0.02% strength by weight solutions of the compounds stated in the table below in tetrahydrofuran were prepared for this purpose. Magnetic tapes consisting of a PET substrate and a 200 nm thick ($Co_{80}Ni_{20}$) layer produced thereon by vapor deposition were drawn through these solutions at a speed of about 1.35 mm/s. Drying was carried out by evaporation of the tetrahydrofuran.

In addition to the compounds preferred for the purposes of the present invention, Fombline-Z-DOL, a perfluoropolyether having terminal hydroxyl groups from Montedison, was used for comparison with the prior art.

The effect of the protective layer produced in this way on the magnetic tapes having a thin metal layer was determined by measuring the superquasistatic friction (SQF). For this purpose, the magnetic tapes were drawn, while oscillating, ie. forward/backward, over a metal pin. The tape tension before the metal pin was 30 cN, the angle of wrap was 90° and the climatic conditions in the test were 23° C. and 50% relative humidity. The coefficient of friction was measured at tape speeds of 550 µm/s ($V_1$) and 13 µm/s ($V_2$). Small coefficients of friction correspond to little friction between tape and metal pin, predominantly static friction forces being measured especially at the lower speed $V_2$.

TABLE

| | Coefficient of friction at | |
|---|---|---|
| | $V_1$ | $V_2$ |
| Compound (1) | 0.29 | 0.19 |
| Compound (3) | 0.17 | 0.13 |
| Compound (4) | 0.21 | 0.15 |
| Fombline-Z-DOL | 0.36 | 0.18 |

We claim:

1. A magnetic recording medium comprising a nonmagnetic substrate and at least one ferromagnetic metal layer applied thereon and a protective layer formed on the metal layer, wherein the protective layer consists of a compound of the formula I $$Z-(CF_2)_m-(CH_2)_n-X-Y-(CH_2)_n-(CF_2)_m-Z \quad (I)$$

where

X is an —S— or —CHOH radical,

Y is an —S— or

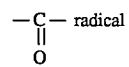

Z is a —$CH_3$, —$CF_3$ or —$CH=CH_2$ radical, n is an integer of from 2 to 17, and m is an integer of from 0 to 7.

2. A magnetic recording medium as defined in claim 1, wherein in the compound of the formula I, m is 0.

3. A magnetic recording medium as defined in claim 1, wherein the compound of the formula I is $[-S-(CH_2)_{11}-CH_3]_2$.

4. A magnetic recording medium as defined in claim 1, wherein the compound of the formula I is $[-S-(CH_2)_{17}-CH_3]_2$.

5. A magnetic recording medium as defined in claim 1, wherein the compound of the formula I is $[-S-(CH_2)_2-(CF_2)_7-CF_3]_2$.

6. A magnetic recording medium as defined in claim 1, wherein the compound of the formula I is $[-S-(CH_2)_2-(CF_2)_5-CF_3]_2$.

7. A magnetic recording medium as defined in claim 1, wherein the compound of the formula I is $H_2C=CH-(CH_2)_8-CHOH-CO-(CH_2)_8-CH=CH_2$.

* * * * *